(12) United States Patent  
Nishizawa

(10) Patent No.: US 12,346,505 B2  
(45) Date of Patent: Jul. 1, 2025

(54) GRIP FOR A COORDINATE INPUT DEVICE

(71) Applicant: Wacom Co., Ltd., Saitama (JP)

(72) Inventor: Naoya Nishizawa, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/167,000

(22) Filed: Feb. 9, 2023

(65) Prior Publication Data

US 2023/0280844 A1 Sep. 7, 2023

(30) Foreign Application Priority Data

Mar. 3, 2022 (JP) ................................ 2022-032292

(51) Int. Cl.

| | | |
|---|---|---|
| *G06F 3/0354* | (2013.01) | |
| *G06F 1/16* | (2006.01) | |
| *G06F 3/02* | (2006.01) | |
| G06F 3/044 | (2006.01) | |
| G06F 3/046 | (2006.01) | |

(52) U.S. Cl.

CPC .......... *G06F 3/0227* (2013.01); *G06F 1/1601* (2013.01); *G06F 3/0446* (2019.05); *G06F 3/046* (2013.01)

(58) Field of Classification Search

CPC ............... G06F 3/0227; G06F 3/03545; G06F 3/041–047; G06F 1/1601; G06F 1/1613

See application file for complete search history.

(56) References Cited

U.S. PATENT DOCUMENTS

| | | | | |
|---|---|---|---|---|
| 5,488,575 A | * | 1/1996 | Danielson .......... | G06K 17/0022 714/E11.14 |
| 5,850,358 A | * | 12/1998 | Danielson ............. | H04L 1/0025 713/300 |
| 6,049,813 A | * | 4/2000 | Danielson .......... | G06K 7/10881 714/E11.14 |

(Continued)

FOREIGN PATENT DOCUMENTS

| | | |
|---|---|---|
| EP | 2446943 A1 | 5/2012 |
| JP | 5808001 B2 | 11/2015 |

OTHER PUBLICATIONS

Extended European Search Report dated Aug. 10, 2023, for the corresponding European Patent Application No. 23152214.5, 9 pages.

*Primary Examiner* — Gene W Lee  
(74) *Attorney, Agent, or Firm* — Seed IP Law Group LLP

(57) ABSTRACT

A coordinate input device is capable of enabling efficient input work by configuring an operation part so as to be operable by a hand opposite to a hand holding an indicator. The coordinate input device includes a position detection sensor which, in operation, detects a position indicated by an indicator, a casing including a rear surface and housing the position detection sensor, the rear surface facing an input surface, the input surface being a surface on which an input operation for inputting the position indicated by the indicator is performed and corresponding to a position detection region of the position detection sensor, and at least one grip part disposed on the rear surface of the casing are included. The at least one grip part includes a projecting portion that projects in a direction intersecting the rear surface and one or more operation parts are disposed on the projecting portion.

20 Claims, 7 Drawing Sheets

(56) References Cited

U.S. PATENT DOCUMENTS

| | | | | |
|---|---|---|---|---|
| 6,121,960 | A * | 9/2000 | Carroll | G06F 1/1626 345/169 |
| 6,144,976 | A * | 11/2000 | Silva | G06F 1/28 713/321 |
| 7,450,372 | B2 * | 11/2008 | Lin | G06F 1/1626 361/679.55 |
| 8,576,564 | B2 * | 11/2013 | Murakata | G06F 1/1613 361/679.59 |
| 8,887,970 | B2 * | 11/2014 | Tsai | G06F 1/1626 224/267 |
| 8,944,913 | B2 * | 2/2015 | Joynes | G06F 1/16 463/36 |
| 9,092,766 | B1 * | 7/2015 | Bedier | G06Q 20/102 |
| 9,274,556 | B2 * | 3/2016 | Gallouzi | G06F 1/1632 |
| 9,344,135 | B2 * | 5/2016 | Fiorentino | H04B 1/3877 |
| 9,529,447 | B2 * | 12/2016 | Hodges | A63F 13/24 |
| 9,721,247 | B2 * | 8/2017 | Bedier | G06Q 20/047 |
| 9,795,213 | B1 * | 10/2017 | Vier | G06F 1/1626 |
| 9,995,432 | B1 * | 6/2018 | Girault | G06F 1/1632 |
| 10,096,012 | B2 * | 10/2018 | Bedier | G07G 1/0009 |
| 10,453,048 | B2 * | 10/2019 | Bedier | G06Q 20/085 |
| 10,528,934 | B2 * | 1/2020 | Bedier | G06Q 20/4016 |
| 10,890,944 | B1 * | 1/2021 | Tien | G06F 1/1666 |
| 10,977,637 | B2 * | 4/2021 | Bedier | G06Q 20/204 |
| 11,216,032 | B2 * | 1/2022 | Ushijima | G06K 7/0004 |
| 11,468,419 | B2 * | 10/2022 | Bedier | G06Q 20/4016 |
| 11,528,987 | B1 * | 12/2022 | Girault | A45F 5/102 |
| 11,561,629 | B1 * | 1/2023 | Monson | G06F 3/0481 |
| 11,768,548 | B2 * | 9/2023 | Choi | G01L 1/205 345/157 |
| 11,951,920 | B2 * | 4/2024 | Tanabe | H01H 9/02 |
| 2001/0040551 | A1 * | 11/2001 | Yates | H01H 9/0235 345/173 |
| 2002/0093493 | A1 * | 7/2002 | Michaeli | G06F 1/1626 345/173 |
| 2005/0275625 | A1 * | 12/2005 | Koenig | G06F 3/033 345/156 |
| 2010/0108409 | A1 * | 5/2010 | Tanaka | G06F 3/0412 345/174 |
| 2012/0106041 | A1 | 5/2012 | Ashida et al. | |
| 2012/0170212 | A1 * | 7/2012 | Gallouzi | F16M 11/38 361/679.56 |
| 2013/0021723 | A1 | 1/2013 | Harper et al. | |
| 2014/0094309 | A1 * | 4/2014 | Osawa | G06F 3/038 463/37 |
| 2014/0139477 | A1 * | 5/2014 | Immonen | G06F 3/0443 345/174 |
| 2015/0084900 | A1 * | 3/2015 | Hodges | A63F 13/2145 345/173 |
| 2015/0273325 | A1 * | 10/2015 | Falc | A63F 13/24 463/37 |
| 2016/0004379 | A1 * | 1/2016 | Ueda | G06F 3/0488 345/173 |
| 2016/0215926 | A1 * | 7/2016 | Pollex | F16M 11/041 |
| 2017/0174496 | A1 * | 6/2017 | Gold | G06F 3/041 |
| 2023/0096335 | A1 * | 3/2023 | Morita | A63F 13/24 463/37 |

* cited by examiner

FIG. 3
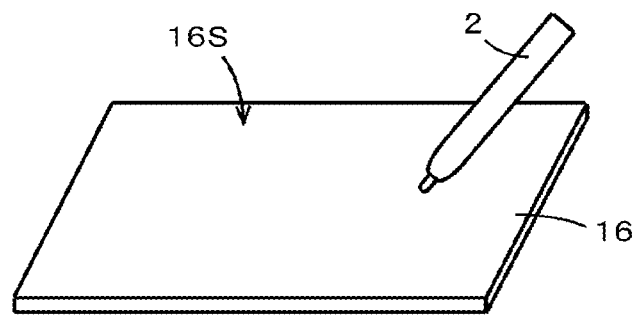
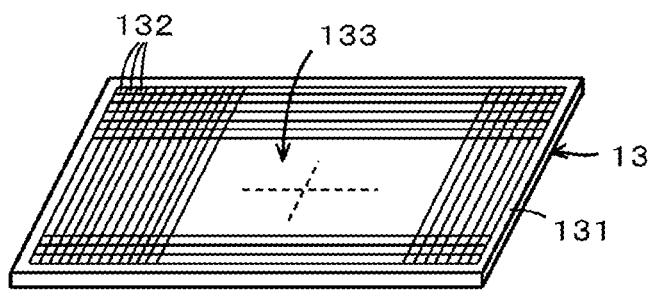
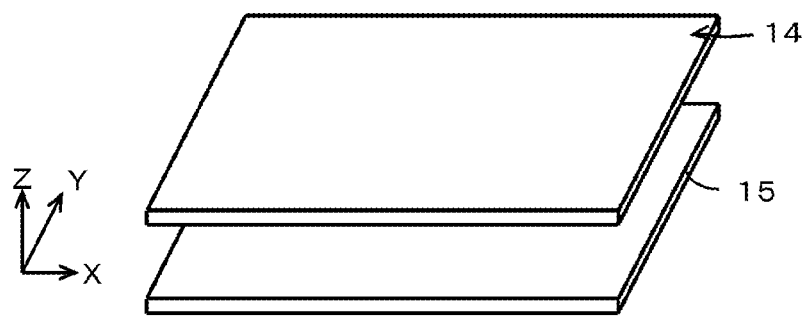

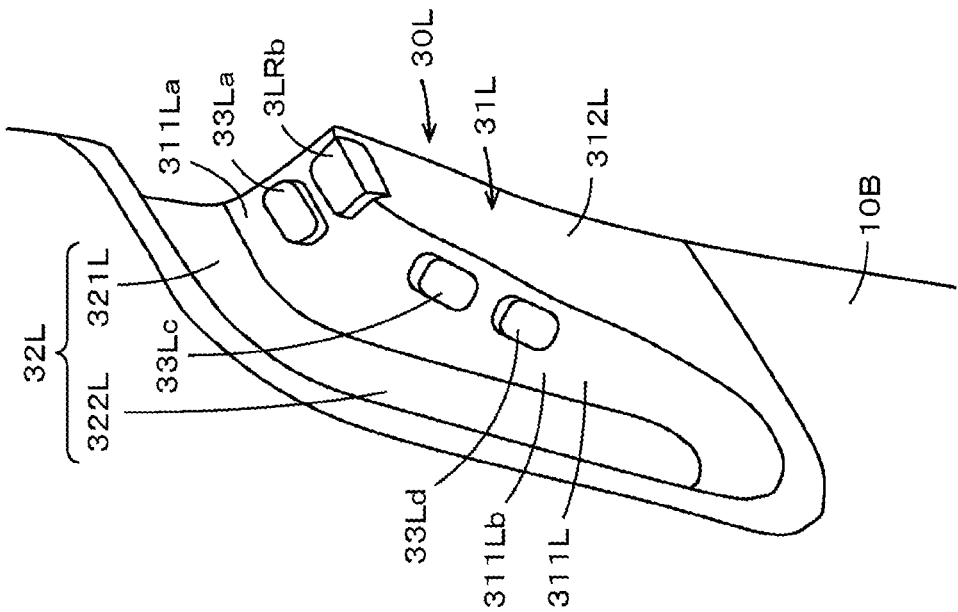
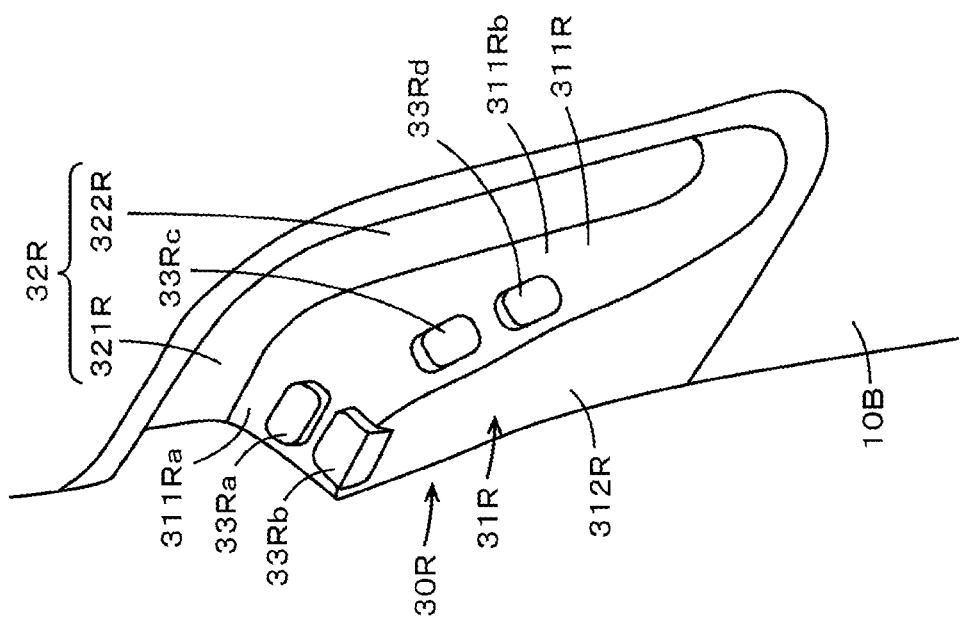

GRIP FOR A COORDINATE INPUT DEVICE

BACKGROUND

Technical Field

The present disclosure relates to a coordinate input device including a position detection sensor that detects a position indicated by an indicator such as an electronic pen or a finger.

Description of the Related Art

Coordinate input devices including position detection sensors that detect a position indicated by an indicator such as an electronic pen or a finger are widely used not only for a writing input of characters but also for drawing of animated images and the like. A coordinate input device of this type includes a display screen including a flat display made of, for example, a liquid crystal display and is configured such that a trajectory based on the position indicated by the indicator and detected by the position detection sensor is displayed on the display screen or such that display corresponding to an indication input based on the position indicated by the indicator is performed (see Patent Document 1 (Japanese Patent No. 5808001), for example).

FIG. 8 is a view for describing an example of a conventional coordinate input device of this type. As illustrated in FIG. 8, a coordinate input device 100 in this example includes a display device part 101, which includes a display screen 101D, and a position detection sensor 102, which detects the position indicated by an electronic pen 200.

The position detection sensor 102 and the electronic pen 200 use, for example, the electromagnetic induction system. As illustrated in FIG. 8, the position detection sensor 102 is disposed on a rear side of the display screen 101D in a superimposed manner such that a position detection region of the position detection sensor and a display region of the display screen 101D are superimposed on each other.

Moreover, as illustrated in FIG. 8, an operator who performs a position indication operation input with the electronic pen 200 holds the electronic pen 200 with his/her hand and performs a coordinate input by performing a position indication input on the display screen 102D, which is an input surface.

Moreover, as illustrated in FIG. 8, the coordinate input device 100 includes a plurality of operation buttons 103L and a plurality of operation buttons 103R for assistance operation of a position indication input with the electronic pen 200. Here, as illustrated in FIG. 8, the plurality of operation buttons 103L are disposed on the left side of the display screen 101D so that a right-handed operator can operate the buttons with his/her left hand when the operator performs a position indication input by holding the electronic pen 200 with his/her right hand. Further, the plurality of operation buttons 103R are disposed on the right side of the display screen 101D so that a left-handed operator can operate the buttons with his/her right hand when the operator performs a position indication input by holding the electronic pen 200 with his/her left hand.

While performing a position indication with the electronic pen 200 on the input surface of the coordinate input device 1, the operator holding the electronic pen 200 can operate the operation buttons 103L or 103R with fingers of the hand that does not hold the electronic pen 200.

PRIOR ART DOCUMENT

Patent Document

Patent Document 1: Japanese Patent No. 5808001

BRIEF SUMMARY

Technical Problems

However, in the coordinate input device 100 according to the above-described example illustrated in FIG. 8, the plurality of operation buttons 103L and 103R are respectively disposed at the left and right ends of the display screen 102D, which is the input surface of the coordinate input device 100. Therefore, there has been a problem that the casing of the coordinate input device 100 becomes large due to the need for installation spaces for the plurality of these operation buttons 103L and 103R. When the size of the casing is determined, there is a problem that an input surface region (position detection region) of the coordinate input device 100 becomes smaller by installation regions of the operation buttons.

Further, in the coordinate input device 100 according to the above-described example illustrated in FIG. 8, the plurality of operation buttons 103L and 103R are disposed at different positions on the same side as the display screen 102D, which is the input surface of the coordinate input device 100. Therefore, the operator has been required to operate the operation buttons 103L and 103R by searching for the positions of the operation buttons 103L and 103R that the operator wants to operate and moving his/her fingers while looking at them. This has required the operator to look away from the display screen 103D and check that the positions of the fingers match the positions of the operation buttons 103L and 103R that the operator wants to operate. Therefore, there has been a possibility that the position indication input operation using the indicator such as the electronic pen 200 is temporarily paused, resulting in poor work efficiency.

It is an object of the present disclosure to provide a coordinate input device capable of solving the problems described above.

Technical Solution

In order to solve the problems described above, there is provided a coordinate input device including a position detection sensor which, in operation, detects a position indicated by an indicator, a casing including a rear surface and housing the position detection sensor, the rear surface facing an input surface, the input surface being a surface on which an input operation for inputting the position indicated by the indicator is performed and corresponding to a position detection region of the position detection sensor, and at least one grip part disposed on the rear surface of the casing, in which the at least one grip part includes a projecting portion that projects in a direction intersecting the rear surface and one or more operation parts are disposed on the projecting portion.

In the coordinate input device having the configuration described above, because the operation parts are disposed on the grip part disposed on the rear surface of the casing, the operation parts do not need to be disposed on an input surface side. Therefore, the position detection region on the input surface side can be enlarged.

Further, because the operation parts are disposed on the projecting portion of the grip part gripped by an operator, the operator can recognize the operation parts at the same positions as when the operator grips the grip part. Therefore, the operator can recognize the operation parts by the muscle memory. Accordingly, the operator does not need to check the positions of the operation parts with his/her eyes and can perform efficient input work by operating the operation parts on the grip part with a hand opposite to a hand holding the indicator, for example.

BRIEF DESCRIPTION OF THE SEVERAL VIEWS OF THE DRAWINGS

FIG. 3 is an exploded perspective view illustrating an example of an internal configuration of the coordinate input device according to an embodiment of the present disclosure.

FIGS. 4A and 4B are an enlarged perspective views of an example of a configuration of a main portion of the coordinate input device according to an embodiment of the present disclosure.

DETAILED DESCRIPTION

Hereinafter, a coordinate input device according to an embodiment of the present disclosure is described with reference to the drawings.

FIGS. 1A, 1B, 2A and 2B are views for describing the appearance of a coordinate input device 1 according to the present embodiment. The coordinate input device 1 according to the present embodiment includes a coordinate input device main body part 10 and a stand part 20 that is coupled to the coordinate input device main body part 10.

In this example, the coordinate input device main body part 10 has a rectangular outer shape and is configured to be thin with a predetermined thickness. In this example, moreover, the coordinate input device main body part 10 has two rectangular surfaces orthogonal to a thickness direction. One surface side thereof is a front surface 10A side, and the other surface side is a rear surface 10B side.

Figure 1A:
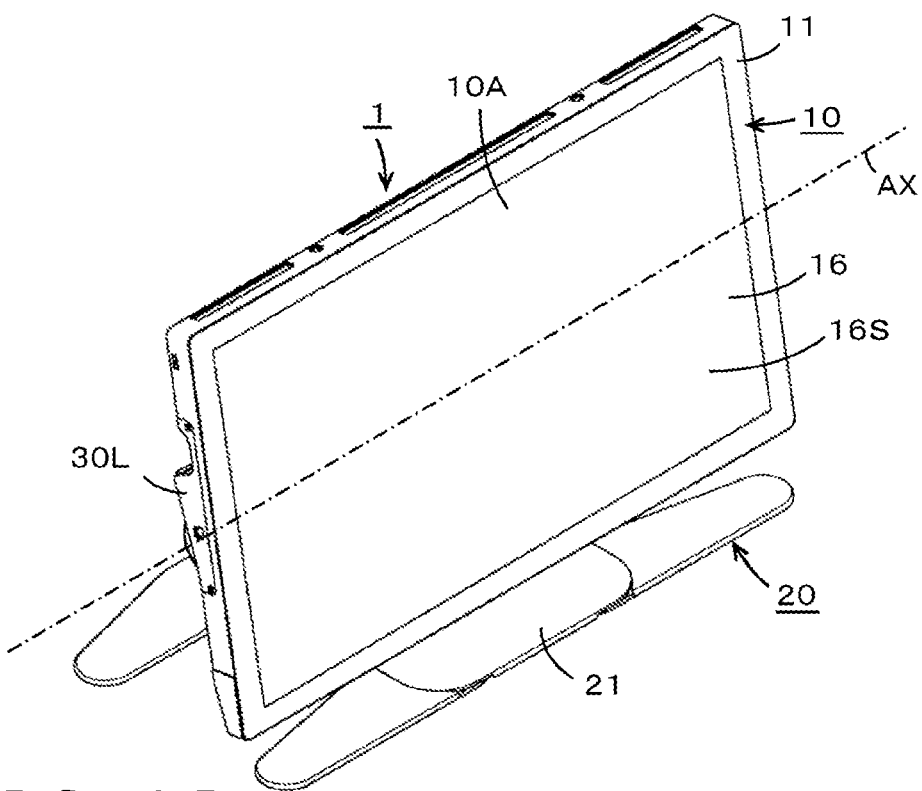
FIGS. 1A and 1B are perspective views for describing the appearance of a coordinate input device according to an embodiment of the present disclosure.
Figure 1B:
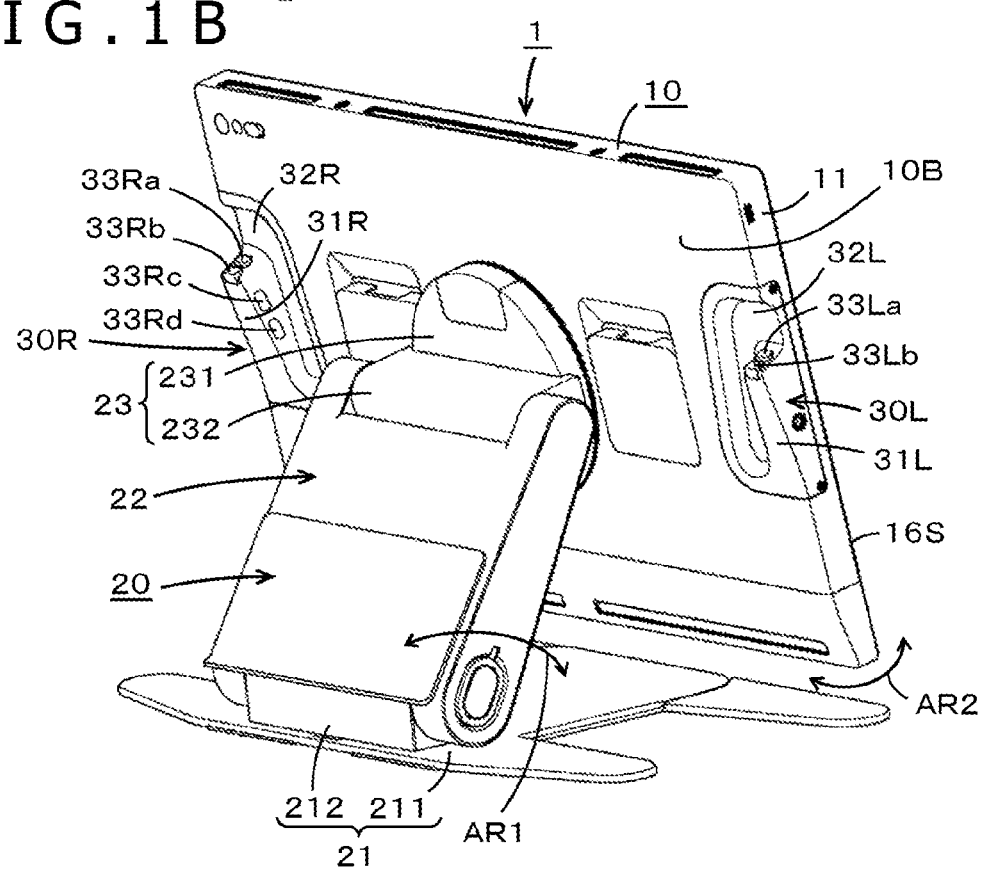
Figure 2A:
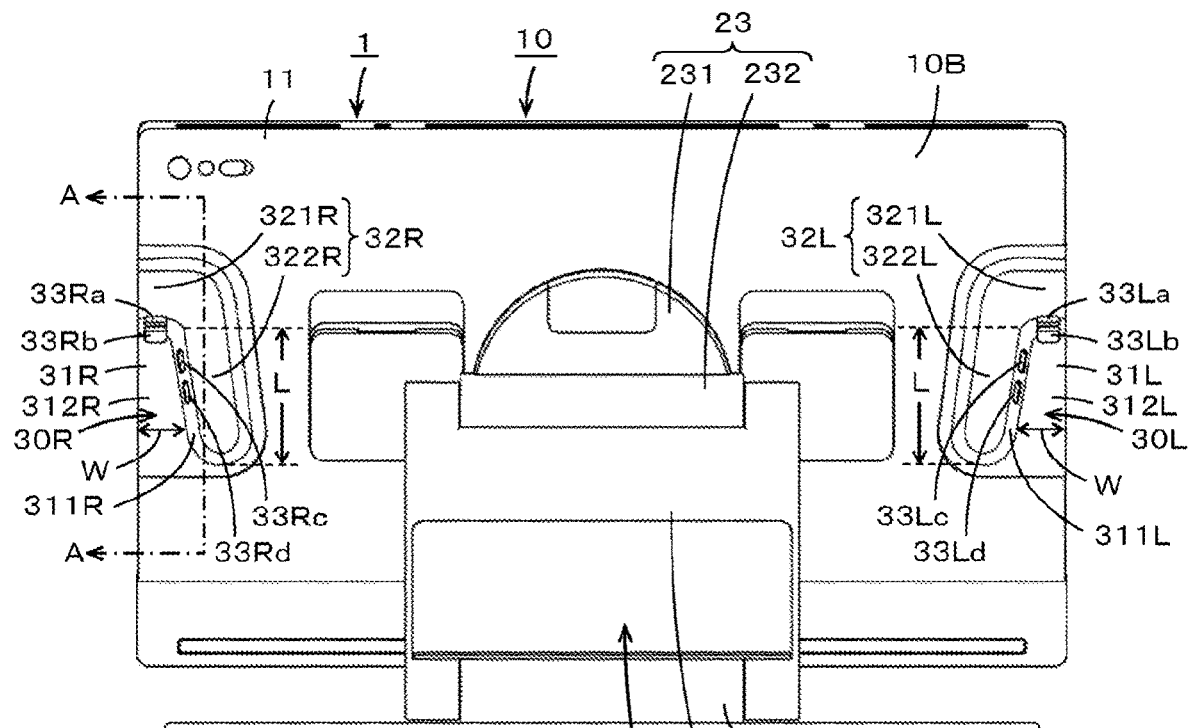
FIGS. 2A and 2B illustrate a rear view and a side view of the coordinate input device according to an embodiment of the present disclosure.
Figure 2B:
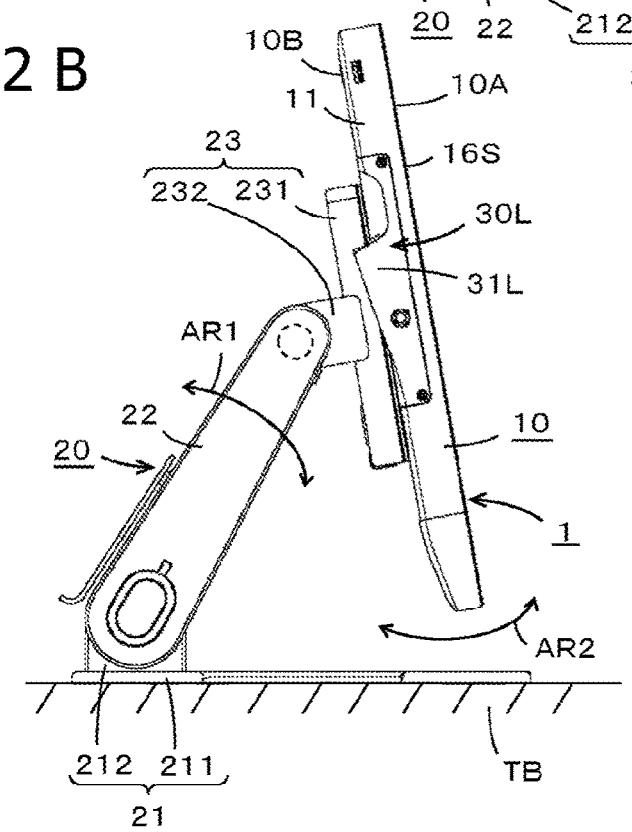

FIG. 1A is an external perspective view of the coordinate input device 1 as viewed from the front surface 10A side, and FIG. 1B is an external perspective view thereof as viewed from the rear surface 10B side. Further, FIG. 2A is a rear view of the coordinate input device 1, and FIG. 2B is a left side view of the coordinate input device 1. Moreover, FIG. 3 is an exploded perspective view illustrating an example of an internal configuration of the coordinate input device 1.

Inside a casing 11 of the coordinate input device main body part 10, in this example, as illustrated in FIG. 3, a position detection sensor 12 of a capacitive coupling system, a display device 13, a position detection sensor 14 of an electromagnetic induction system, a control circuit board 15, and a planar member 16, which is made of a transparent material such as, for example, glass or resin, are arranged in order in a superimposed manner.

The casing 11 is made of, for example, a synthetic resin. A recessed portion is formed in this casing 11 to house the position detection sensor 12, the display device 13, the position detection sensor 14, the control circuit board 15, and so forth. An opening side of the recessed portion of the casing 11 is the front surface 10A side of the coordinate input device main body part 10. After the position detection sensor 12, the display device 13, the position detection sensor 14, the control circuit board 15, and so forth are housed in the recessed portion of the casing 11, the opening side of the recessed portion of the casing 11 is closed by the planar member 16, thereby forming the coordinate input device main body part 10.

The display device 13 includes a flat display such as a liquid crystal display or an organic EL (electroluminescence) display and includes a display screen 133 in which a large number of display pixels 132 are arranged in an X-axis direction (lateral direction) and a large number of display pixels 132 are arranged in a Y-axis direction (longitudinal direction) orthogonal to the X-axis direction on a display board 131.

The position detection sensor 12 of the capacitive coupling system includes, for example, a plurality of linear X conductors and a plurality of linear Y conductors. The plurality of linear X conductors are arranged in the X-axis direction, which is the lateral direction of the rectangular outer shape of the coordinate input device main body part 10. The plurality of linear Y conductors are arranged in the Y-axis direction (the longitudinal direction of the rectangular outer shape of the coordinate input device main body part 10) so as to orthogonally intersect the plurality of X conductors. The position detection sensor 12 is disposed on a front surface side of the display screen 133 of the display device 13 and is disposed such that a position detection region of the position detection sensor 2 and a display region of the display screen 133 of the display device 13 are superimposed on each other.

Further, the position detection sensor 14 of the electromagnetic induction system includes an X-axis direction loop coil group including a plurality of loop coils arranged in the X-axis direction and a Y-axis direction loop coil group including a plurality of loop coils arranged in the Y-axis direction. The position detection sensor 14 is disposed on a rear surface side of the display screen 133 of the display device 13 and is disposed such that a position detection region of the position detection sensor and the display region of the display device 13 are superimposed on each other. Therefore, the position detection sensor 12 and the position detection sensor 14 are in the relationship in which their position detection regions are disposed so as to be superimposed on each other.

In other words, the position detection region of the position detection sensor 12, the position detection region of the position detection sensor 14, and the display region of the display screen 133 of the display device 13 have approximately the same size and are in the relationship in which they are disposed so as to be superimposed on each other.

A contact detection circuit of a capacitive system to which the position detection sensor 12 is connected, a position detection circuit of the electromagnetic induction system to which the position detection sensor 14 is connected, a display control circuit of the display device 11, a control circuit which includes a microcomputer for controlling those circuits and monitoring the operation of a plurality of operation buttons described later to generate corresponding control signals, other electronic components, and copper foil wiring patterns are mounted on the control circuit board 15.

A surface 16S on one side of the planar member 16, which is made of a transparent material such as glass or resin, serves as an input surface when an electronic pen 2 or a finger as an example of an indicator performs an input operation for inputting a position indication by contacting the input surface. Hereafter, the surface 16S on one side of the planar member is referred to as an input surface 16S of the coordinate input device 1. It is noted that, in the coordinate input device 1 according to the present embodiment, an electronic pen of the electromagnetic induction system is used as the electronic pen 2 to enable a high-definition coordinate input and the position indicated by the electronic pen 2 is detected by the position detection sensor 14.

The stand part 20 includes a base portion 21, an arm portion 22, and a main body coupling portion 23 which is coupled to the rear surface 10B of the coordinate input device main body part 10.

The base portion 21 includes, in this example, a planar plate-like body portion 211 and a connecting portion 212 which is connected to the arm portion 22. The plate-like body portion 211 of the base portion 21 is placed such that a plate-like surface on a bottom surface side of the plate-like body portion 211 is in contact with a top surface (see FIG. 2B) of a mounting base TB such as a table or the like on which the coordinate input device 1 is placed. The connecting portion 212 is disposed so as to project from a top surface of the plate-like body portion 211.

The main body coupling portion 23 includes a fixed coupling portion 231 and a connecting portion 232. The fixed coupling portion 231 is deposited and fixed at, in this example, substantially the center position of the rear surface 10a of the coordinate input device main body part 10. The connecting portion 232 is connected to the arm portion 22. The fixed coupling portion 231 has, in this example, a circular plate-like body. The connecting portion 232 is disposed so as to project in a direction orthogonal to the rear surface 10B from a surface that is included in the fixed coupling portion 231 having the plate-like body and that is parallel to the rear surface 10B.

The arm portion 22 is a rectangular plate-like member and is disposed so as to connect the base portion 21 and the main body coupling portion 23. In the present embodiment, the arm portion 22 is shaped such that an end edge thereof on the base portion 21 side and an end edge thereof on the main body coupling portion 23 side are straight lines parallel to each other.

Moreover, an end of the arm portion 22 on the base portion 21 side is coupled to and attached to the connecting portion 212 of the base portion 21 in a state in which the arm portion 22 is turnable (swingable) relative to the base portion 21 around a turning axis (not illustrated) in a direction parallel to the straight end edge of the arm portion 22 on the base portion 21 side as indicated by an arrow AR1 in FIGS. 1B and 2B.

In this case, the arm portion 22 is turnably (swingably) attached to the connecting portion 212 of the base portion 21 in a state in which the angle between the arm portion 22 and the base portion 21 can be locked at any position. The turning (swinging) of the arm portion 22 relative to the base portion 21 in the direction indicated by the arrow AR1 enables the change of the height position of the coordinate input device main body part 10 relative to the mounting base TB.

Further, the main body coupling portion 23 is attached to the arm portion 22 by coupling an end of the arm portion on the main body coupling portion 23 side to the connecting portion 232 of the main body coupling portion 23 in a state in which the main body coupling portion 23 is turnable about a turning axis (not illustrated) in a direction parallel to the straight end edge of the arm portion 22 on the main body coupling portion 23 side. In this case, the main body coupling portion 23 is turnably attached to the arm portion 22 at the connecting portion 232 in a state in which the angle between the main body coupling portion 23 and the arm portion 22 can be locked at any position.

Accordingly, the coordinate input device main body part 10, to which the main body coupling portion 23 is fixed, is turnable in a tilt direction around the turning axis in the direction parallel to the straight end edge of the arm portion 22 on the main body coupling portion 23 side, that is, around a turning axis AX (see FIG. 1A), which is the turning center, in the lateral direction at the intermediate position in the longitudinal direction of the coordinate input device main body part 10 having the rectangular outer shape, as indicated by an arrow AR2 in FIGS. 1B and 2B. That is, the coordinate input device main body part 10 is configured such that the angle between a front surface direction of the input surface 16S of the coordinate input device main body part 10 and the top surface of the mounting base TB can be changed. It is noted that, in this case, the position of the turning axis of the turning of the coordinate input device main body part 10 in the tilt direction corresponds to the position at which the main body coupling portion 23 of the stand part 20 is coupled on the rear surface 10B of the coordinate input device main body part 10 and is not limited to the center position in the longitudinal direction as illustrated in FIG. 1A.

Example of Configuration of Grip Parts 30L and 30R on Rear Surface 10B Side of Coordinate Input Device Main Body Part 10

In the coordinate input device 1 according to the present embodiment, grip parts 30L and 30R are respectively disposed at ends of both the left and right sides near the end edges of the rear surface 10B of the coordinate input device main body part 10, in this example, near the end edges in the lateral direction of the coordinate input device main body part 10. In the present embodiment, the grip part 30L is configured so as to be grippable by a right-handed operator with his/her left hand while the grip part 30R is configured so as to be grippable by a left-handed operator with his/her right hand. These grip parts 30L and 30R have similar configurations in this example. In the present embodiment, however, the grip parts 30L and 30R are configured to have a line-symmetrical relationship. FIG. 4A illustrates an enlarged perspective view of the grip part 30L at the left end. FIG. 4B illustrates an enlarged perspective view of the grip part 30R at the right end.

It is noted that, in the present embodiment, since the coordinate input device main body part 10 is held by the stand part 20, a space into which a hand is inserted can be secured on the rear surface 10B side of the coordinate input device main body part 10.

The grip parts 30L and 30R include projecting portions 31L and 31R and recessed portions 32L and 32R, respectively. The projecting portions 31L and 31R project in a direction intersecting, in this example, orthogonal to the rear surface 10B of the coordinate input device main body part 10. The recessed portions 32L and 32R are disposed on the peripheries of the projecting portions 31L and 31R, respectively. Moreover, a plurality of operation buttons 33La, 33Lb, 33Lc, and 33Ld, which are examples of a plurality of operation parts, are disposed on the projecting portion 31L of the grip part 30L. Similarly, a plurality of operation buttons 33Ra, 33Rb, 33Rc, and 33Rd, which are examples of the plurality of operation parts, are disposed on the projecting portion 31R of the grip part 30R. In this example, the operation buttons 33La to 33Ld and 33Ra to 33Ld are configured by push button switches. It is noted that the operation buttons are not limited to push button switches and slide switches can be used.

The grip part 30L is configured such that, in a state in which a right-handed operator performs a position indication operation input on the input surface 16S by holding the electronic pen 2 with the right hand, the right-handed operator can operate the plurality of operation buttons 33La, 33Lb, 33Lc, and 33Ld by putting the left hand around the rear surface 10B from the left end side of the coordinate input device main body part 10. Further, the grip part 30R is configured such that, in a state in which a left-handed operator performs a position indication operation input on the input surface 16S by holding the electronic pen 2 with the left hand, the left-handed operator can operate the plurality of operation buttons 33Ra, 33Rb, 33Rc, and 33Rd by putting the right hand around the rear surface 10B from the right end side of the coordinate input device main body part 10.

For this purpose, the projecting portion 31L is shaped and sized so as to be grippable by the operator with the left hand, and the projecting portion 31R is shaped and sized so as to be grippable by the operator with the right hand. Moreover, the recessed portion 32L is disposed such that, when the operator grips the projecting portion 31L with the left hand, four fingers of the left hand other than the thumb can be inserted into the recessed portion 32L. Further, the recessed portion 32R is formed such that, when the operator grips the projecting portion 31R with the right hand, four fingers of the right hand other than the thumb can be inserted into the recessed portion 32R (see FIG. 5).

The projecting portion 31L includes, in this example, a side portion 311L which is in the direction intersecting the rear surface 10B of the coordinate input device main body part 10, and an upper surface portion 312L which faces and is separated from the rear surface 10B of the coordinate input device main body part 10 by a predetermined distance (see FIG. 4B). Similarly, the projecting portion 31R includes, in this example, a side portion 311R which is in the direction intersecting the rear surface 10B of the coordinate input device main body part 10, and an upper surface portion 312R which faces and is separated from the rear surface 10B of the coordinate input device main body part 10 by a predetermined distance (see FIG. 4A).

Moreover, in this example, in the grip part 30L disposed at the left end of the coordinate input device main body part 10, a side portion of the projecting portion 31L at the left end of the coordinate input device main body part 10 is formed so as to be flush with a side surface at the left end of the casing 11 of the coordinate input device main body part 10 as illustrated in FIGS. 1B, 2A, and 4. Further, in this example, in the grip part 30R disposed at the right end of the coordinate input device main body part 10, a side portion of the projecting portion 31R at the right end of the coordinate input device main body part 10 is formed so as to be flush with a side portion at the right end of the casing 11 of the coordinate input device main body part 10 as illustrated in FIGS. 1B, 2A, and 4.

If the grip parts 30L and 30R are positioned on an inner side of the rear surface, it may be difficult to reach the grip parts with hands. However, since the grip parts 30L and 30R are respectively disposed at the left end and the right end of the coordinate input device main body part 10 as in this example, the operator can easily operate the operation buttons on the grip part while operating the electronic pen 2.

In the present embodiment, a length L (see FIG. 2A) of each of the projecting portion 31L and the projecting portion 31R in the longitudinal direction of the coordinate input device main body part 10 is larger than a length thereof in the lateral direction of the coordinate input device main body part 10, that is, a width W (see FIG. 2A) of each of the projecting portion 31L and the projecting portion 31R, and the width W of each of the projecting portion 31L and the projecting portion 31R becomes narrower toward an upward direction in the longitudinal direction of the coordinate input device main body part 10.

Moreover, the recessed portions 32L and 32R are respectively disposed on the peripheries of the projecting portions 31L and 31R except for the portions that are respectively flush with the left end and the right end of the coordinate input device main body part 10. That is, upper-side recessed portions 321L and 321R are formed so as to be respectively continuous with recessed portions 322L and 322R in the longitudinal direction. The upper-side recessed portions 321L and 321R are respectively on the peripheries of side portions 311La and 311Ra (see FIGS. 4A and 4B) on the upper side in the longitudinal direction of the coordinate input device main body part 10 within the side portions 311L and 311R of the projecting portions 31L and 31R in the direction intersecting the rear surface 10B of the coordinate input device main body part 10. The recessed portions 322L and 322R are respectively formed adjacent to the peripheries of side portions 311Lb and 311Rb in a length L direction along the longitudinal direction of the coordinate input device main body part 10.

Figure 5:
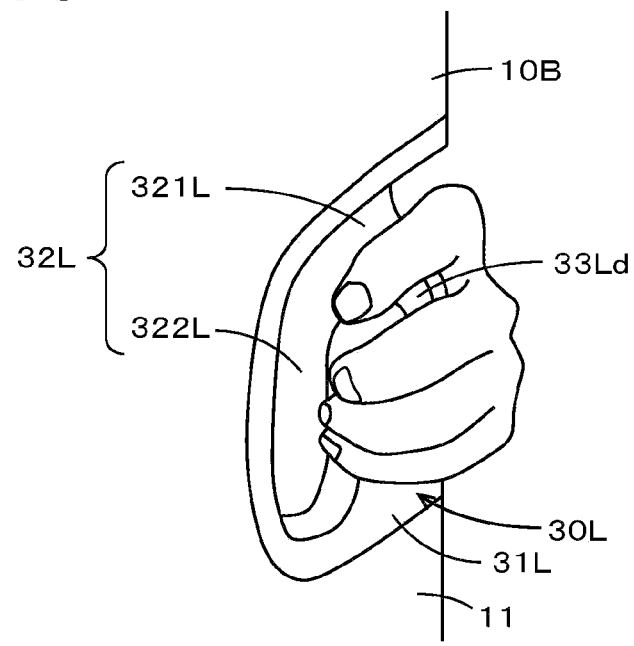
FIG. 5 is a view for describing the example of the configuration of the main portion of the coordinate input device according to an the embodiment of the present disclosure.

As illustrated in FIG. 5, the length L in the longitudinal direction of each of the projecting portions 31L and 31R has a length with which the corresponding projecting portion 31L or 31R can be gripped with three fingers of the middle finger, the ring finger, and the little finger of a hand or has a length larger than that. The width W of each of the projecting portions 31L and 31R has a width with which when the corresponding projecting portion 31L or 31R is gripped by putting a hand from the input surface 16S side of the coordinate input device main body part 10, tips of the middle finger, the ring finger, and the little finger of the hand are inserted into the corresponding recessed portion 322L or 322R, and balls of these fingers are in contact with the side portion of the corresponding projecting portion 31L or 31R, as illustrated in FIG. 5.

Moreover, the width of each of the recessed portions 32L and 32R (the length in the extending direction of the width direction of each of the projecting portions 31L and 31R) has, as illustrated in FIG. 5, a width with which the ball of the index finger of the hand can be positioned on the corresponding side portion 311La or 311Ra and the balls of first joints of the middle finger, the ring finger, and the little finger can be positioned on the corresponding side portion 311Lb or 311Rb. The side portions 311La and 311Ra are on the upper side of the projecting portions 31L and 31R, respectively. The side portions 311Lb and 311Rb are in the length L direction of the projecting portions 31L and 31R, respectively.

Further, the height of each of the upper surface portions 312L and 312R of the projecting portions 31L and 31R from the bottom of each of the recessed portions 32L and 32R has, as illustrated in FIG. 5, a height with which the ball of the index finger and the balls of the first joints of the middle finger, the ring finger, and the little finger of the hand can be positioned on the corresponding side portion 311L or 311R of the projecting portions 31L and 31R. In the present embodiment, however, the height from the bottom of each of the recessed portions 32L and 32R to each of the upper surface portions 312L and 312R of the projecting portions 31L and 31R is not uniform and is configured so as to be different in the length L direction (the longitudinal direction of the coordinate input device main body part 10) of the projecting portions 31L and 31R.

Figure 6:
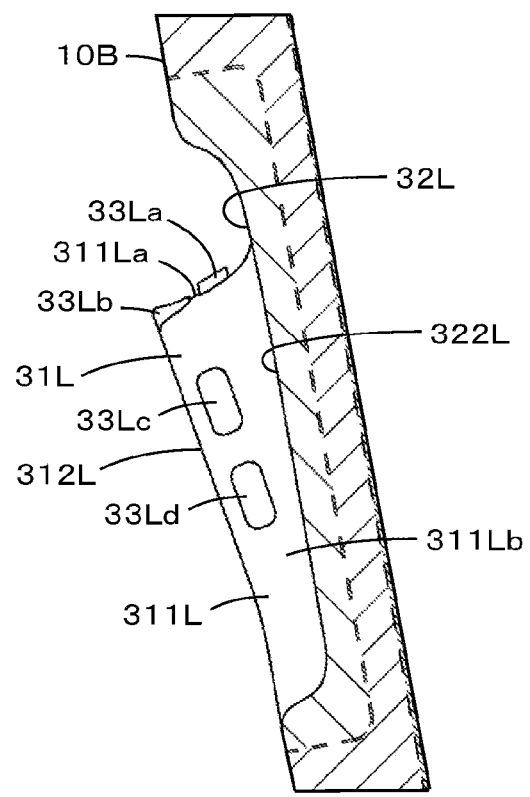
FIG. 6 is a cross-sectional view taken along line A-A of the rear view of FIG. 2A.

FIG. 6 is a cross-sectional view taken along line A-A of FIG. 2 and is a cross-sectional view of the grip part 30R at the right end. As illustrated in FIG. 6 as well as FIGS. 1B and 4, the upper surface portions 312L and 312R of the projecting portions 31L and 31R are configured such that the lower side thereof in the longitudinal direction of the rear surface 10B of the coordinate input device main body part 10 is, in this example, flush with the rear surface 10B of the coordinate input device main body part 10, and such that the height from the bottom of each of the recessed portions 32L and 32R increases more on the upper side of the upper surface portions 312L and 312R such that the upper surface portions 312L and 312R protrude from the rear surface 10B of the coordinate input device main body part 10.

Moreover, in the present embodiment, as illustrated in FIGS. 2B and 6, the recessed portions 32L and 32R are respectively formed adjacent to the peripheries of the projecting portions 31L and 31R in a state in which the bottom surfaces of the recessed portions 32L and 32R are lower than the rear surface 10B. By forming the grip parts 30L and 30R in this way, the amount of projection of the projecting portions 31L and 31R from the rear surface 10B can be suppressed, and the optimum grip can be ensured.

In this case, the angles formed by intersections between the side portions 311L and 311R of the projecting portions 31L and 31R and the respective bottoms of the recessed portions 32L and 32R are configured to be slightly obtuse as illustrated in FIGS. 4 and 6, and the side portions 311L and 311R of the projecting portions 31L and 31R are configured to be slightly spread out toward the bottoms of the respective recessed portions 32L and 32R. With this configuration, the operator can easily grip the projecting portions 31L and 31R with the hand of the operator and can easily press against the side portions 311L and 311R of the projecting portions 31L and 31R with the balls of the fingers.

Moreover, when the grip part 30L is gripped by the left hand, the index finger of the left hand is inserted into the side portion 311La on the upper side of the side portion 311L of the projecting portion 31L in the longitudinal direction of the coordinate input device main body part 10, as illustrated in FIG. 5. Similarly, when the grip part 30R is gripped by the right hand, the index finger of the right hand is inserted into the side portion 311Ra on the upper side of the side portion 311R of the projecting portion 31R in the longitudinal direction of the coordinate input device main body part 10.

In the present embodiment, as illustrated in FIGS. 1B, 2A, and 4, the operation buttons 33La and 33Lb and the operation buttons 33La and 33Lb are respectively disposed on the side portions 311La and 311Ra on the upper side of the projecting portions 31L and 31R and at different positions in the height direction of the projecting portions 31L and 31R. In this case, the operation buttons 33La and 33Ra are planar knob switches with their pressing operation surfaces parallel to the respective side portions 311La and 311Ra. Further, the operation buttons 33Lb and 33Rb are corner switches that have respective pressing operation surfaces and that can receive a pressing input in the direction intersecting the respective pressing operation surfaces. Each of the pressing operation surfaces has two surfaces including a surface parallel to the corresponding side portion 311La or 311Ra and a surface parallel to the corresponding upper surface portion 312L or 312R. It is noted that, since the side portions 311La and 311Ra on the upper side of the projecting portions 31L and 31R are higher than the others, the two operation buttons 33La and 33Lb and the operation buttons 33Ra and 33Rb can be disposed side by side as illustrated in the figure.

Moreover, when the grip part 30L is gripped by the left hand, the balls of the first joints of the middle finger, the ring finger, and the little finger of the left hand are in contact with the side portion 311Lb of the projecting portion 31L adjacent to the recessed portion 322L, as illustrated in FIG. 5. Similarly, when the grip part 30R is gripped by the right hand, the balls of the first joints of the middle finger, the ring finger, and the little finger of the left hand are in contact with the side portion 311Lb of the projecting portion 31L adjacent to the recessed portion 322L, as illustrated in FIG. 5.

As illustrated in FIGS. 4A and 4B, in the present embodiment, the operation buttons 33Lc and 33Rc are respectively disposed on the side portions 311Lb and 311Rb of the projecting portions 31L and 31R at positions with which the ball of the first joint of the middle figure is in contact, and the operation buttons 33Ld and 33Rd are respectively disposed on the side portions 311Lb and 311Rb of the projecting portions 31L and 31R at positions with which the ball of the first joint of the ring finger is in contact. In this case, in the present embodiment, the operation buttons 33Lc and 33Rc and the operation buttons 33Ld and 33Rd are planar knob switches with their pressing operation surfaces parallel to the respective side portions 311La and 311Ra.

Each of the operation buttons 33La to 33Ld and 33Ra to 33Rd is assigned any of various functions of the coordinate input device 1 according to the present embodiment with respect to the pressing operation thereof. The function assigned to each of the operation buttons 33La to 33Ld and 33Ra to 33Rd may be predetermined in advance. Alternatively, function settings of the operation buttons may be selected from a menu, and the function to each of the operation buttons may be selectively set. In this example, the menu activation and item selection such as selection and settings of the operation buttons from a menu can be performed on the basis of the result of the detection of the position indicated by a finger of the operator by the position detection sensor 12 of the capacitive coupling system.

In the present embodiment, as described above, the grip parts 30L and 30R at the left end and the right end of the rear surface 10B of the coordinate input device main body part 10 are used for the left hand of a right-handed operator and for the right hand of a left-handed operator, respectively. The operation buttons at the identical positions to each other between the operation buttons 33La to 33Ld of the grip part 30L and the operation buttons 33Ra to 33Rd of the grip part 30R are assigned the identical functions.

Examples of the functions assigned to the operation buttons 33La to 33Ld of the grip part 30L and the operation buttons 33Ra to 33Rd of the grip part 30R include "redo,"

"undo," "indication of display color intensity," "resize," and so forth. Needless to say, however, the examples are not limited thereto.

It is noted that, in the present embodiment, the grip parts 30L and 30R are formed separately from the casing 11 of the coordinate input device main body part 10 and are formed so as to be fitted and attached to fitting portions for the grip parts 30L and 31R formed in the casing 11. Needless to say, however, the grip parts 30L and 30R may be formed integrally with portions on the rear surface 10A side of the casing 11 of the coordinate input device main body part 10.

Example of Electrical Configuration of Coordinate Input Device 1

In the coordinate input device 1 configured as described above, the operator holds the electronic pen 2 with his/her dominant hand and performs writing or drawing by a position indication input with the electronic pen 2 on the input surface 16S. Then, while performing the position indication input operation with the electronic pen 2, the operator performs a position indication operation on the input surface 16S with a finger of a non-dominant hand at an appropriate timing or grips the grip part 30L or 30R to operate the operation buttons 33La to 33Ld or the operation buttons 33Ra to 33Rd.

The coordinate input device 1 according to the present embodiment receives the above-described operation input and performs processing and control corresponding to the operation input in an electrical processing unit.

Figure 7:
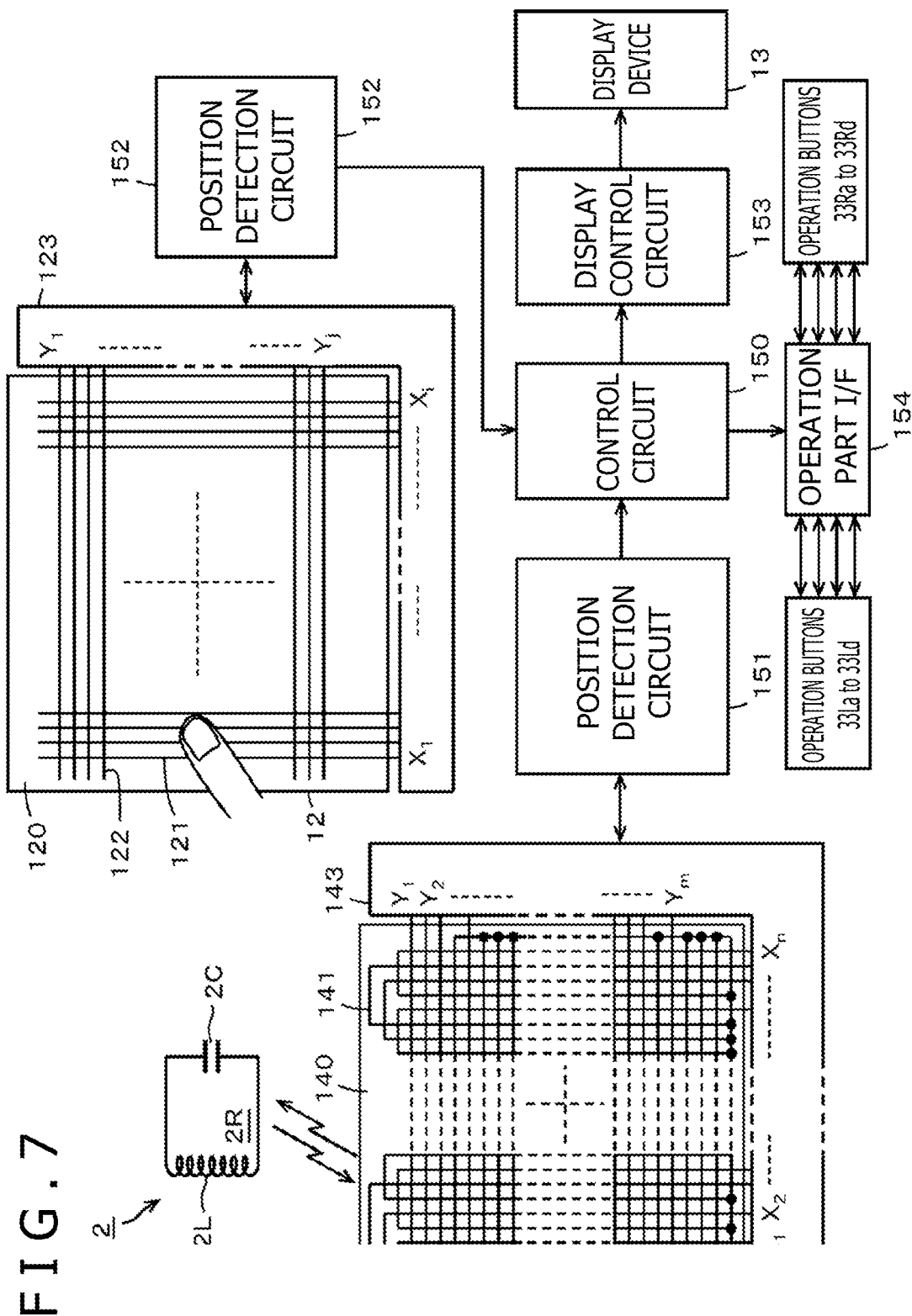
FIG. 7 is a diagram for describing an example of an electrical configuration of the coordinate input device according to an the embodiment of the present disclosure.
Figure 8:
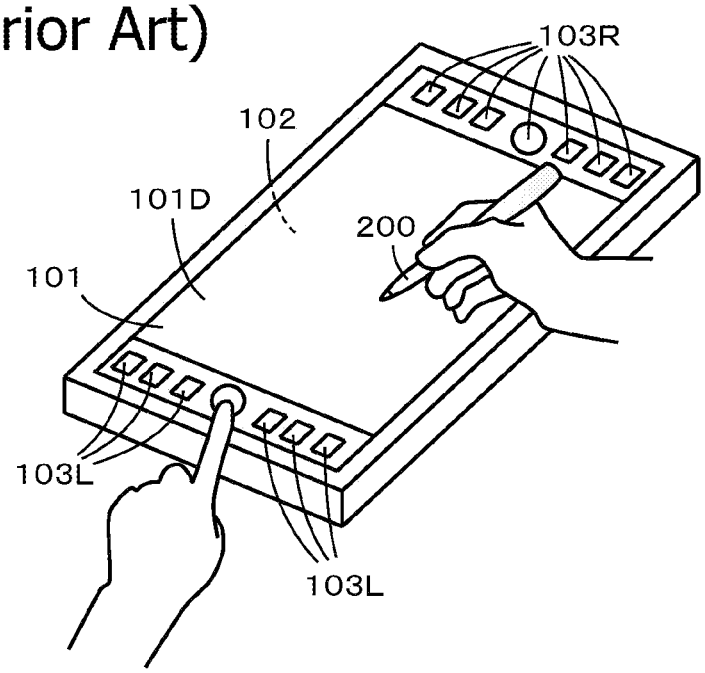
FIG. 8 is a view for describing a conventional coordinate input device.

FIG. 7 illustrates an example of a configuration of the electrical processing unit of the coordinate input device 1 according to the present embodiment. As illustrated in FIG. 7, the electronic pen 2 of the electromagnetic induction system includes a resonance circuit 2R as its circuit configuration. The resonance circuit 2R includes a position indication coil 2L and a resonance capacitor 2C which is connected in parallel to the position indication coil 2L.

Moreover, the position detection sensor 14 includes an X-axis direction loop coil group 141 and a Y-axis direction loop coil group 142, which are formed on the front and back sides of a substrate 140. The X-axis direction loop coil group 141 and the Y-axis direction loop coil group 142 are connected to a position detection circuit 151 via a selection circuit 143. The selection circuit 143 operates so as to sequentially select one or a plurality of loop coils from the two loop coil groups 141 and 142 in response to the reception of a selection control signal from the position detection circuit 151.

The position detection circuit 151 transmits an alternating-current signal of a predetermined frequency to the electronic pen 2 through the loop coil(s) selected by the selection circuit 143. The electronic pen 2 receives the alternating-current signal from the position detection sensor 14 at the resonance circuit 2R and causes the alternating-current signal to be fed back from the resonance circuit 2R to the position detection sensor 14 through electromagnetic induction coupling.

The induction voltage generated at the loop coil selected by the selection circuit 143 in response to the signal fed back from the electronic pen 2 is supplied to the position detection circuit 151. On the basis of the level of the voltage value of the induction voltage generated at each loop coil, the position detection circuit 151 calculates the coordinate value of the position indicated by the electronic pen 2 in the X-axis and Y-axis directions of a detection region of the position detection sensor 14. The position detection circuit 151 supplies the calculated coordinate value of the position indicated by the electronic pen 2 to a control circuit 150.

The position detection sensor 12 of the capacitive coupling system includes an X-axis direction linear conductor group 121 and a Y-axis direction linear conductor group 122, which are formed on the front and back of a transparent substrate 120. The X-axis direction linear conductor group 121 and the Y-axis direction linear conductor group 122 are connected to a position detection circuit 152 via a selection circuit 123.

Moreover, in this example, the selection circuit 123 sequentially selects one or a plurality of linear conductors from the Y-axis direction linear conductor group 122 in response to the reception of a selection control signal from the position detection circuit 152 and sequentially supplies a predetermined transmission signal such as a spreading code to the selected linear conductor(s). Then, reception signals of the transmission signals from the X-axis direction linear conductor group are received, and a reception process is performed. By detecting that the reception signal acquired at the position where a finger is present is different from the reception signals at the other positions, the position indicated by the finger is detected. The position detection circuit 152 supplies the detected coordinate value of the position indicated by the finger to the control circuit 150.

In the coordinate input device 1 according to the present embodiment, an operation part interface (denoted as "I/F" in FIG. 7) 154 is connected to the control circuit 150, and each of the operation buttons 33La to 33Ld of the grip part 30L and each of the operation buttons 33La to 33Ld of the grip part 30R are connected to the operation part interface 154.

The control circuit 150 has a function of detecting the operated operation button through the operation part interface 154 when any of the operation buttons 33La to 33Ld of the grip part 30L is operated or when any of the operation buttons 33La to 33Ld of the grip part 30L is operated.

Then, the control circuit 150 generates pen trace information or drawing information based on time-series data of coordinates of the position indicated by the electronic pen 2 and detected by the position detection circuit 151 and supplies the pen trace information or drawing information to a display control circuit 320. The display control circuit 320 generates display information based on the received pen trace information or drawing information, supplies the generated display information to the display device 13, and causes the display screen 133 to display the pen trace or drawing image using the electronic pen 2.

Further, the control circuit 150 activates the function set corresponding to the coordinate position indicated by the finger and detected by the position detection circuit 152, generates display information corresponding to the function, and supplies the display information to the display control circuit 153. The display control circuit 320 supplies the display information corresponding to the received function to the display device 13 and causes the display screen 133 to display a display image such as a list of function menus or a list of setting items together with the pen trace or drawing image using the electronic pen 2.

Moreover, in the present embodiment, the control circuit 150 changes and controls the color and size of the pen trace or the drawing image using the electronic pen 2 or performs control for "redoing" or "undoing" an indication input operation of the electronic pen 2 on the basis of any of the operation buttons 33La to 33Ld of the grip part 30L or any of the operation buttons 33La to 33Ld of the grip part 30L detected through the operation part interface 154. The display control circuit 153 reflects the display control corresponding to the control by the control circuit 150 in the display image on the display screen 133 of the display device 3.

Effects of Coordinate Input Device 1 According to Embodiment

In the coordinate input device 1 according to the present embodiment configured as described above, the operator performs a position indication input operation using the electronic pen 2 with one hand while gripping one of the grip parts 30L and 30R with the other hand and operating the operation buttons 33La to 33*ld* or the operation buttons 33Ra to 33Rd or performing a touch input on the input surface with a finger of the other hand. Thus, the operator can conveniently perform various function processes while performing a writing input with the electronic pen on the display screen.

In this case, as illustrated in FIG. 5, when the operator grips the projecting portion 31L and 31R of the grip parts 30L or 30R with the left or right hand, the operator can not only perform a pressing operation on the operation button 33La or 33Ra or the operation button 33Lb or 33Rb with the index finger but also perform a pressing operation on the operation button 33Lc or 33Rc with the middle finger and the operation button 33Lc or 33Rc with the ring finger, respectively.

Therefore, the operator can recognize and correctly operate each of the operation buttons 33La to 33Ld of the grip part 30L or each of the operation buttons 33Ra to 33Rd of the grip part 30R without checking with his/her eyes, in addition to the effect of a muscle memory. Therefore, even when the operator holds the electronic pen 2 with his/her dominant hand and performs a position indication input operation while gripping the projecting portion 31L or 31R of the grip parts 30L and 30R with the other hand and operates the operation buttons 33La to 33Ld or the operation buttons 33Ra to 33Rd, the operator does not need to operate the operation buttons while checking the positions of the operation buttons with his/her eyes, as before. This enables efficient input work.

Other Embodiments or Modifications

The coordinate input device 1 according to the embodiment described above includes the coordinate input device main body part 10 and the stand part 20. However, the stand part 20 is not an essential constituent component in the coordinate input device according to the present disclosure, and only the coordinate input device main body part 10 may be included.

It is noted that, in the embodiment described above, the grip parts 30L and 30R are used for a left hand of a right-handed operator and for a right hand of a left-handed operator, respectively, and the operation buttons at the identical positions to each other between the operation buttons 33La to 33Ld of the grip part 30L and the operation buttons 33Ra to 33Rd of the grip part 30R are assigned the identical functions. However, the operation buttons 33La to 33Ld of the grip part 30L may be assigned different functions from the operation buttons 33Ra to 33Rd of the grip part 30R.

Further, although the grip part is disposed at each of the left and right ends in the lateral direction of the coordinate input device main body part 10 having the rectangular outer shape, the grip part may be disposed on only one side. Further, the grip part may be disposed at either or both of the upper and lower ends in the longitudinal direction of the coordinate input device main body part 10 having the rectangular outer shape. Further, the number of grip parts may be three or more, instead of one or two. Further, the positions at which the operation buttons are disposed may be different between different grip parts.

Further, as long as the grip part is disposed at a position that can be reached and gripped by a hand of the operator, the grip part may be disposed in the substantial middle of the rear surface of the coordinate input device, instead of an end of the rear surface of the coordinate input device.

Further, although the operation buttons as an example of the operation parts are disposed only on the side portion of the projecting portion of each grip part in the embodiment described above, the operation parts may be disposed on the upper surface portion of the projecting portion or on both the side portion and the upper surface portion thereof.

Further, although the recessed portion is formed adjacent to the projecting portion of each grip part in the embodiment described above, each grip part can be configured without the recessed portion by forming the projecting portion from the rear surface of the coordinate input device.

Further, although the operation buttons are used as an example of the operation parts in the embodiment described above, the operation parts are not limited to the operation buttons. Any of the operation parts, such as, for example, a touch sensor (touch panel), a wheel, and a trackball can be used as the operation parts as long as the user can operate them without visually checking. Further, the plurality of operation parts may be a combination of operation buttons, a touch sensor, a trackball, and the like, instead of the same type of operation parts such as a plurality of operation buttons, for example.

Further, the number of operation parts disposed on the projecting portion of each grip part is not limited to four and may be one. Further, any number of operation parts may be disposed as long as the operation buttons can be recognized by a muscle memory.

Further, the shape of the projecting portion of each grip part is not limited to the above-described example. For example, the shape thereof may be such that a recessed portion is formed in the side portion of the projecting portion according to the position with which a ball of a finger is in contact when the projecting portion is gripped by a hand. Further, the shape of the projecting portion is not limited to the shape having the side portion and the upper surface portion as in the example described above and can be a spherical shape, a columnar shape with a polygonal cross section, or various other shapes.

Further, the outer shape of the coordinate input device does not have to be a rectangle as in the embodiment described above and may be an oval, a circle, a polygon, or the like. In such cases, each grip part may be disposed at any position as long as it is on the rear surface side of the coordinate input device.

Further, although both the position detection sensors of the electromagnetic induction system and the capacitive coupling system are included in the embodiment described above, only the position detection sensor of one of the systems may be included. Further, needless to say, a position detection sensor of any other system may be used without limiting to the electromagnetic induction system or the capacitive coupling system.

It is noted that, instead of a finger only, an electronic pen of a passive system may be used as an indicator with respect to the position detection sensor of the capacitive coupling system. Further, the position detection sensor of the capacitive coupling system may use a position detection sensor and an electronic pen of an active capacitive coupling system.

Further, although the coordinate input device according to the embodiment described above includes the display device, the display device may be a separate body, and the coordinate input device may not include the display device.

DESCRIPTION OF REFERENCE SYMBOLS

1: Coordinate input device
2: Electronic pen
10: Coordinate input device main body part
11: Casing
12: Position detection sensor
13: Display device
14: Position detection sensor
15: Control circuit board
16: Planar member
20: Stand part
30L and 30R: Grip part
31L and 31R: Projecting portion
32L and 32R: Recessed portion
33La to 33Ld, 33Ra to 33Rd: Operation button The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A coordinate input device, comprising:
a position detection sensor which, in operation, detects a position indicated by an indicator;
a casing including a rear surface and housing the position detection sensor between the rear surface and an input surface, the rear surface being opposite the input surface, the input surface being a surface on which an input operation for inputting the position indicated by the indicator is performed and corresponding to a position detection region of the position detection sensor; and
at least one grip part disposed on the rear surface of the casing,
wherein the at least one grip part includes a projecting portion that projects in a direction intersecting the rear surface, and one or more operation parts are disposed on the projecting portion,
wherein the projecting portion is shaped and sized so as to be grippable by an operator,
wherein a recessed portion is formed in the rear surface of the casing adjacent to at least part of a periphery of the projecting portion and adjacent to the one or more operation parts disposed on the projecting portion,
wherein the recessed portion is disposed at approximately a middle of a longitudinal side of the coordinate input device, and
wherein, in operation, a finger of the operator is inserted into the recessed portion disposed at approximately the middle of the longitudinal side of the coordinate input device and formed in the rear surface of the casing adjacent to at least one of the one or more operation parts disposed on the projecting portion when the operator grips the projecting portion.

2. The coordinate input device according to claim 1, wherein the at least one grip part is disposed adjacent to an end edge of the rear surface of the casing.

3. The coordinate input device according to claim 2, wherein part of a side portion of the projecting portion in the direction intersecting the rear surface is a surface along a side surface of the casing between the rear surface and the input surface.

4. The coordinate input device according to claim 1, wherein the projecting portion is shaped and sized so as to be grippable by an operator.

5. The coordinate input device according to claim 1,
wherein the recessed portion includes a first side surface on which an index finger of the operator is positioned when the operator grips the projecting portion, and
wherein the recessed portion includes a second side surface on which a middle finger, a ring finger, and a little finger of the operator are positioned when the operator grips the projecting portion.

6. The coordinate input device according to claim 1, wherein the one or more operation parts are disposed on a portion of the projecting portion on the rear surface adjacent to the recessed portion.

7. The coordinate input device according to claim 1, wherein the one or more operation parts include an operation part disposed on a surface of the projecting portion in the direction intersecting the rear surface.

8. The coordinate input device according to claim 1, wherein the one or more operation parts include an operation part disposed across both a side portion of the projecting portion in the direction intersecting the rear surface and an upper surface portion of the projecting portion facing the rear surface.

9. The coordinate input device according to claim 1, wherein a stand part holding the casing is disposed on the rear surface such that the input surface is in a direction intersecting a surface on which the coordinate input device is placed and such that a space is created between the rear surface and the surface on which the coordinate input device is placed.

10. The coordinate input device according to claim 9, wherein the at least one grip part is disposed near an end edge of the rear surface of the casing in a direction parallel to the surface on which the coordinate input device is placed.

11. The coordinate input device according to claim 9, wherein the at least one grip part includes two grip parts, and wherein the two grip parts are disposed adjacent respective opposite end edges of the rear surface of the casing in a direction parallel to the surface on which the coordinate input device is placed.

12. The coordinate input device according to claim 11, wherein the one or more operation parts are disposed on the two grip parts disposed adjacent to the respective opposite end edges and the one or more operation parts disposed on each of the two grip parts are assigned identical functions.

13. The coordinate input device according to claim 11, wherein the one or more operation parts are disposed on the two grip parts disposed adjacent to the respective opposite end edges and the one or more operation parts disposed on each of the two grip parts are assigned different functions.

14. The coordinate input device according to claim 9, wherein the stand part includes a mechanism which, in operation, changes an angle of the input surface in the direction intersecting the surface on which the coordinate input device is placed.

15. The coordinate input device according to claim 1, wherein the one or more operation parts are assigned a function related to an input of the position indicated by the indicator.

16. The coordinate input device according to claim 1, further comprising:
   a display device including a display screen overlapping with the position detection region of the position detection sensor.

17. The coordinate input device according to claim 1, wherein the position detection sensor detects the position indicated by the indicator using an electromagnetic induction system.

18. The coordinate input device according to claim 1, wherein the position detection sensor detects the position indicated by the indicator using a capacitive coupling system.

19. The coordinate input device according to claim 1, wherein the one or more operation parts include any of an operation button, a touch sensor, and a trackball, and the one or more operation parts are operatable by a user without the user visually checking the one or more operation parts.

20. The coordinate input device according to claim 1, wherein the longitudinal side of the coordinate input device extends between two lateral sides of the coordinate input device, and wherein a length of the longitudinal side of the coordinate input device is less than a length of each of the lateral sides of the coordinate input device.

* * * * *